United States Patent [19]

Okano

[11] 3,748,385

[45] July 24, 1973

[54] DATA SIGNAL TRANSMISSION SYSTEM EMPLOYING PHASE MODULATION

[75] Inventor: Yoshimitsu Okano, Tokyo, Japan

[73] Assignee: Nippon Electric Company Limited, Tokyo, Japan

[22] Filed: Dec. 9, 1970

[21] Appl. No.: 96,314

[30] Foreign Application Priority Data

Feb. 10, 1970 Japan ................................ 45/12078

[52] U.S. Cl. ................ 178/67, 179/15 BC, 325/30, 325/60, 325/163, 325/320

[51] Int. Cl. ............................................ H04l 27/24

[58] Field of Search ................ 178/67; 325/30, 163, 325/320, 60; 179/15 BC

[56] References Cited

UNITED STATES PATENTS

| | | | |
|---|---|---|---|
| 3,128,343 | 4/1964 | Baker | 178/67 |
| 3,163,718 | 12/1964 | Deman | 325/60 |
| 3,348,149 | 10/1967 | Crafts et al. | 178/67 |
| 3,341,776 | 9/1967 | Doelz et al. | 325/30 |
| 3,485,949 | 12/1969 | Haas | 325/320 |
| 3,378,637 | 4/1968 | Kawai et al. | 178/67 |
| 3,371,279 | 2/1968 | Lender | 178/67 |
| 2,870,431 | 1/1959 | Babcock | 178/67 |

*Primary Examiner*—Albert J. Mayer
*Attorney*—Marn & Jangarathis

[57] ABSTRACT

A data signal transmission system employing phase and amplitude deviation information comprising a transmitter including a source of an input data serial binary signal having a predetermined number of bits; means for converting the data signal into a plurality of parallel pulse signals, each representing one data signal bit, modulating means for phase deviating a carrier signal different angular amounts and indicating resultant vectors of combined vectors corresponding to phase deviations of the respective parallel pulse signals, and means for serially combining the carrier signal as phase deviated different amounts together with the resultant vectors to represent the input serial data signal; and a receiver including means demodulating the received serially combined phase deviated carrier signal together with the resultant vectors to reproduce the transmitter input data serial binary signal.

2 Claims, 24 Drawing Figures

INVENTOR.
Yoshimitsu Okano
BY
Marn & Jangarathis
ATTORNEYS $(\Phi_{1i}, \Phi_{2j})$ is a combination of information INVENTOR.
Yoshimitsu Okano
BY
Marn & Jangarathis
ATTORNEYS INVENTOR.
Yoshimitsu Okano
BY
Marn & Jangarathis
ATTORNEYS INVENTOR.
Yoshimitsu Okano
BY
Marn & Jangarathis
ATTORNEYS INVENTOR.
Yoshimitsu Okano
BY
Marn & Jangarathis
ATTORNEYS INVENTOR.
Yoshimitsu Okano
BY
Marn & Jangarathis
ATTORNEYS INVENTOR.
Yoshimitsu Okano
BY
*Marn & Jangarathis*
ATTORNEYS INVENTOR.
Yoshimitsu Okano
BY
Marn & Jangarathis
ATTORNEYS INVENTOR.
Yoshimitsu Okano
BY
Mann & Jangarathis
ATTORNEYS INVENTOR.
Yoshimitsu Okano
BY
Marn & Jangarathis
ATTORNEYS INVENTOR.
Yoshimitsu Okano
BY
Marn & Jangarathis
ATTORNEYS INVENTOR.
Yoshimitsu Okano
BY
Marn & Jangarathis
ATTORNEYS

DATA SIGNAL TRANSMISSION SYSTEM EMPLOYING PHASE MODULATION

This invention relates to a data transmission system employing phase modulation and, more particularly, to a data transmission system in which $m$ sets of phase modulation, each utilizing at most $n$ steps of phase-shift angles different from those used in other sets, are applied simultaneously to a common carrier for time division multiplexing.

It is the common practice in this technical field that the transmission speed is increased by increasing $n$ keeping $m$=1. However, there is a maximum limitation of $n$.

An object of this invention is to provide a data transmission system in which the frequency band is used more effectively by increasing $m$ with a view to realising a higher speed transmission.

The data transmission system of this invention comprises means for converting each successive group of $l$ bits of a serial binary data signal into $m$ sets of bit-parallel signals, $m$ being an integer greater than 1 and $l$ being an integral multiple of $m$, means for separately phase modulating common carrier frequency in accordance with each set of the bit parallel signals, thereby to provide a plurality of modulate signals each of which has its phase selected from $n$ possible phases, ($n$ being a positive integer), in a manner determined by the combination of bits of the correspondingly bit-parallel signal, the possible phase of each modulated signal being different from those of the other modulated signals, and means for combining the modulated signals vectorially to provide a combined signal having successive portions corresponding to the successive groups of $l$ bits, each such portion representing the $l$-bits corresponding thereto by the combination of its amplitude and phase.

Two pairs of four-phase modulation and demodulation according to this invention will be explained as an example of its embodiment by referring to the appended drawings (this example corresponds to $l = 4$, $m$=2, $n$=4).

BRIEF DESCRIPTION OF THE DRAWING

FIGS. 1($a$) and ($b$) show vectors of two pairs of four-phase phase-modulated signals. A phase modulation/-demodulation system wherein one vector is chosen from each pair of four-phase modulated signals as shown in FIGS. 1($a$) and 1($b$), and the resultant two vectors are combined will be explained. The signal of one bit ahead (hereinafter referred to as "preceding bit signal"), which is a reference signal, is assumed as follows:

$$fb(t) = \cos w_c t \ldots . \quad (1)$$

where $w_c$ is carrier angular frequency, and $t$ is time.

Figure 1A:
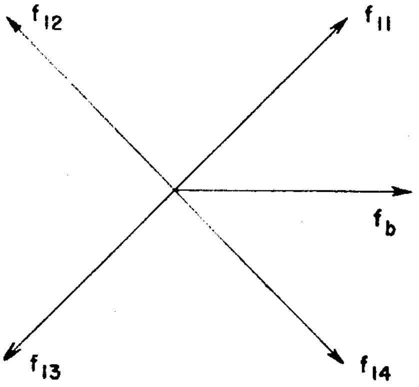
FIGS. 1($a$) and ($b$) are vector diagrams showing how the phase of a common carrier is caused to shift by using two modulators.
Figure 1B:
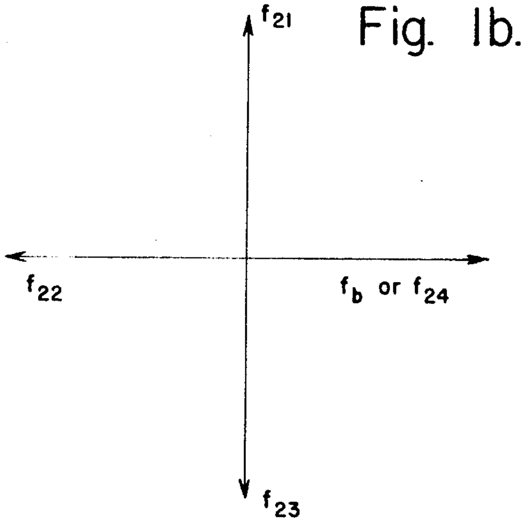
Figure 2A:
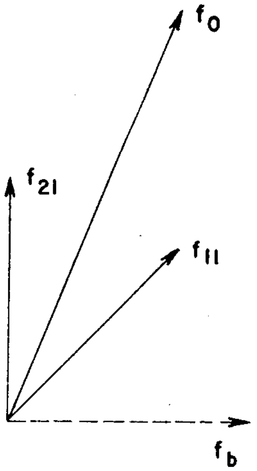
FIGS. 2($a$) – 2($d$) are vectors diagrams illustrating how two modulated signals are combined.
Figure 2D:
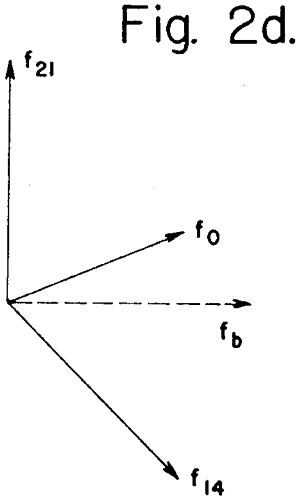
Figure 2B:
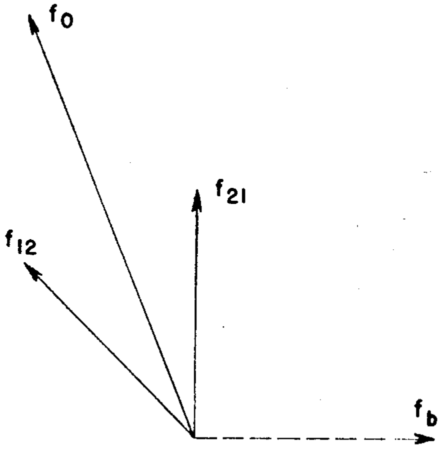
Figure 2C:
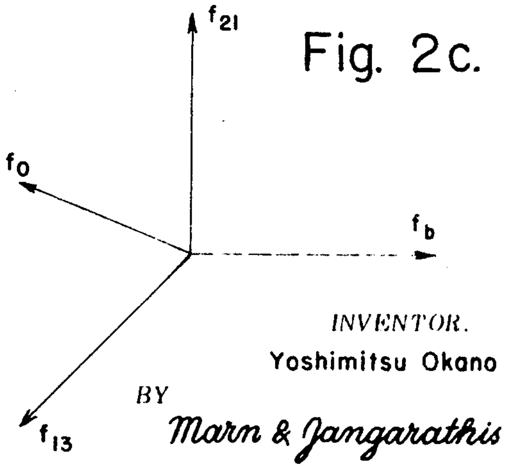

Generally, this expression is supposed to have the initial phase $\phi$. In this example, however, $\phi$ is assumed zero since this assumption will not affect the fundamental description of the principles thereof. Two pairs of phase-modulated signals are formed from the preceding bit signal by the use of two modulators.

$$f_{1i}(t) = \cos(w_c t + \phi_{1i}) \ (i = 1, 2, 3, 4) \ldots . \quad (2)$$

where $\phi_{11} = 45°$, $\phi_{12} = 135°$, $\phi_{13} = 225°$, $\phi_{14} = 315°$ $$f_{2j}(t) = \cos(w_c t + \phi_{2j}) \ (j = 1, 2, 3, 4) \ldots \quad (3)$$

where $\phi_{21} = 90°$, $\phi_{22} = 180°$, $\phi_{23} = 270°$, $\phi_{24} = 360°$ FIGS. 1($a$) and 1($b$) show $f_{1i}(t)$ and $f_{2j}(t)$ respectively. Two pairs of these modulated signals are combined in the form of:

$$f_0(t) = \cos(w_c t + \phi_{1i}) + \cos(w_c t + \phi_{2j}) \ldots \quad (4)$$

FIGS. 2($a$) – ($d$) show the relationship between these vectors and the vectors of the preceding bit signal. In other words, FIGS. 2($a$) – ($d$) show the wave $f_0(t)$ combined from the vector of $f_{21}(t)$ and vectors $f_{1i}(t)$ ($i$ = 1,2,3,4), and also show the vector of previous bit signal $f_b(t)$. As illustrated therein, the deviation angle between the two vectors is either 45° (FIGS. 2($a$) and 2($b$)) or 135°(FIGS. 2($c$) and 2(d)), and the amplitude of the combined wave vector is either large (FIGS. 2(*a*) and 2(*b*)) or small (FIGS. 2(*c*) and 2(*d*)).

Figure 3:
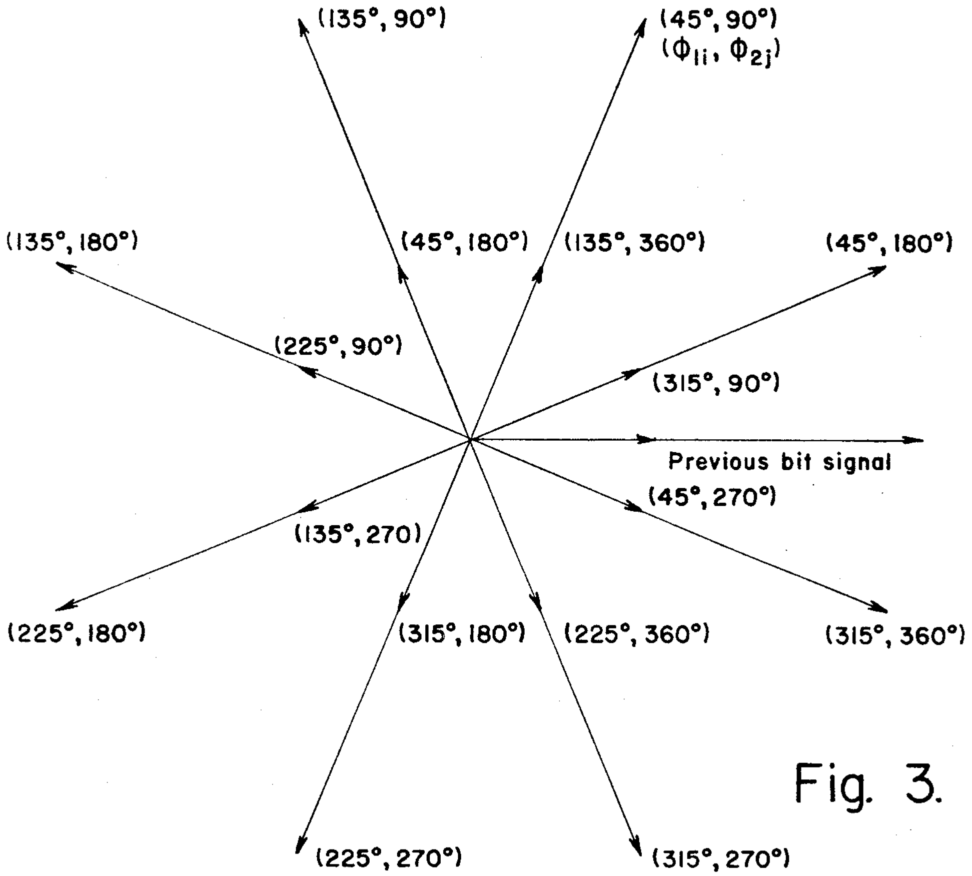
FIG. 3 is a vector diagram showing the phase relationships between a preceding bit signal and a present bit signal.

The method of detecting the combined wave $f_0(t)$ and thus providing the signals as shown by Equations (2) and (3) will be explained below. All combinations of $f_0(t)$ are shown in FIG. 3. The numerals in parentheses indicate ($\phi_{1i}$, $\phi_{2j}$). In order to demodulate the signal, it is first necessary to obtain the information which is to show whether the amplitude of said combined vector is large or small. This information can be obtained by square detection of $f_0(t)$. Namely, $$\{f_0(t)\}^2 = \{\cos(w_ct + \phi_{1i}) + \cos(w_ct + \phi_{2j})\}^2$$
$$= 1 + \cos(\phi_{1i} - \phi_{2j}) + ½\cos(2w_ct + 2\phi_{1i})$$
$$+ ½\cos(2w_ct + 2\phi_{2j}) \ldots . \quad (5)$$

By passing $f_0(t)^2$ through a low-pass filter, the output can be produced as $$1 + \cos(\phi_{1i} - \phi_{2j}) \ldots . \quad (6)$$

It will be apparent that this signal gives the information regarding two kinds of amplitudes, and that the radio of the two values of the signal is 1: $(1 + \sqrt{2})^2$.

Figure 4A:
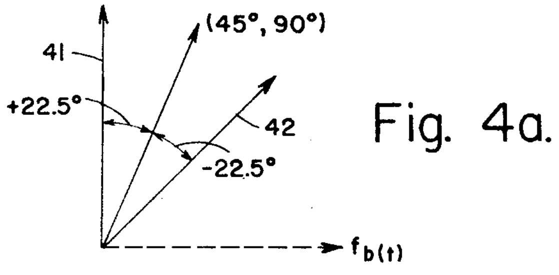
FIGS. 4($a$) and ($b$) are vector diagrams illustrating the principle of detecting an original signal.
Figure 4B:
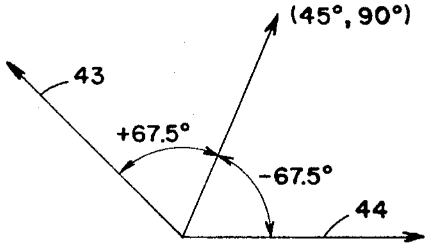

It is the second step for demodulating the vector ($\phi_{1i}$, $\phi_{2j}$) to form four vectors with +22.5°, −22.5°, +67.5° and −67.5° phase-deviation from the received vector. As one example, a case where the received vector is (45°, 90°) will be described. The relationship between this vector and said four vectors is shown in FIGS. 4(*a*) and (*b*). Among these vectors 41 through 44, the vector having a phase difference of one of $\phi_{1i}$ with respect to $f_b(t)$ (previous bit signal), (namely, vectors 42 and 43) is a vector contained in $f_{1i}(t)$, and that having a phase difference of one of $\phi_{2j}$ (namely, vectors 41 and 44) is a vector contained in $f_{2j}(t)$.

When said four vectors are detected by $f_b(t)$,
Detected output of vector 41 is zero,
Detected output of vector 42 is positive,
Detected output of vector 43 is negative, and
Detected output of vector 44 is positive.

The vectors giving said positive, negative and zero combination must be only of (45°, 90°) or (135°, 360°). In the case of (45°, 90°), the information of larger amplitude will be obtained by the procedure of the first step. This shows that the received vector which has been combined is of (45°, 90°). Namely, in the foregoing manner, the information ($\phi_{1i}$, $\phi_{2j}$) of the received combined vector can be obtained.

Table 1 shows the relationship between information ($\phi_{1i}$, $\phi_{2j}$) and combinations of information obtained in the first and second steps.

TABLE 1

| Amplitude Information | Value of Deviation from $f_0(t)$ +22.5° | −67.5° | −22.5° | +67.5° | $\phi_{1i}$ | $\phi_{2j}$ |
|---|---|---|---|---|---|---|
| Large | | | | | | |
| | + | + | + | 0 | 45° | 360° |
| | − | + | 0 | − | 135° | 90° |
| | − | − | − | 0 | 225° | 180° |
| | + | − | 0 | + | 315° | 270° |
| | 0 | + | + | − | 45° | 90° |
| | − | 0 | − | − | 135° | 180° |
| | 0 | − | − | + | 225° | 270° |
| | + | 0 | + | + | 315° | 360° |
| small | | | | | | |
| | + | + | + | 0 | 315° | 90° |
| | − | + | 0 | − | 45° | 180° |
| | − | − | − | 0 | 135° | 270° |
| | + | − | 0 | + | 225° | 360° |
| | 0 | + | + | − | 135° | 360° |
| | − | 0 | − | − | 225° | 90° |
| | 0 | − | − | + | 315° | 180° |
| | + | 0 | + | + | 45° | 270° |

Note: Signs +, —0 indicate the polarities of the output detected by $f_b(t)$.

Figure 5:
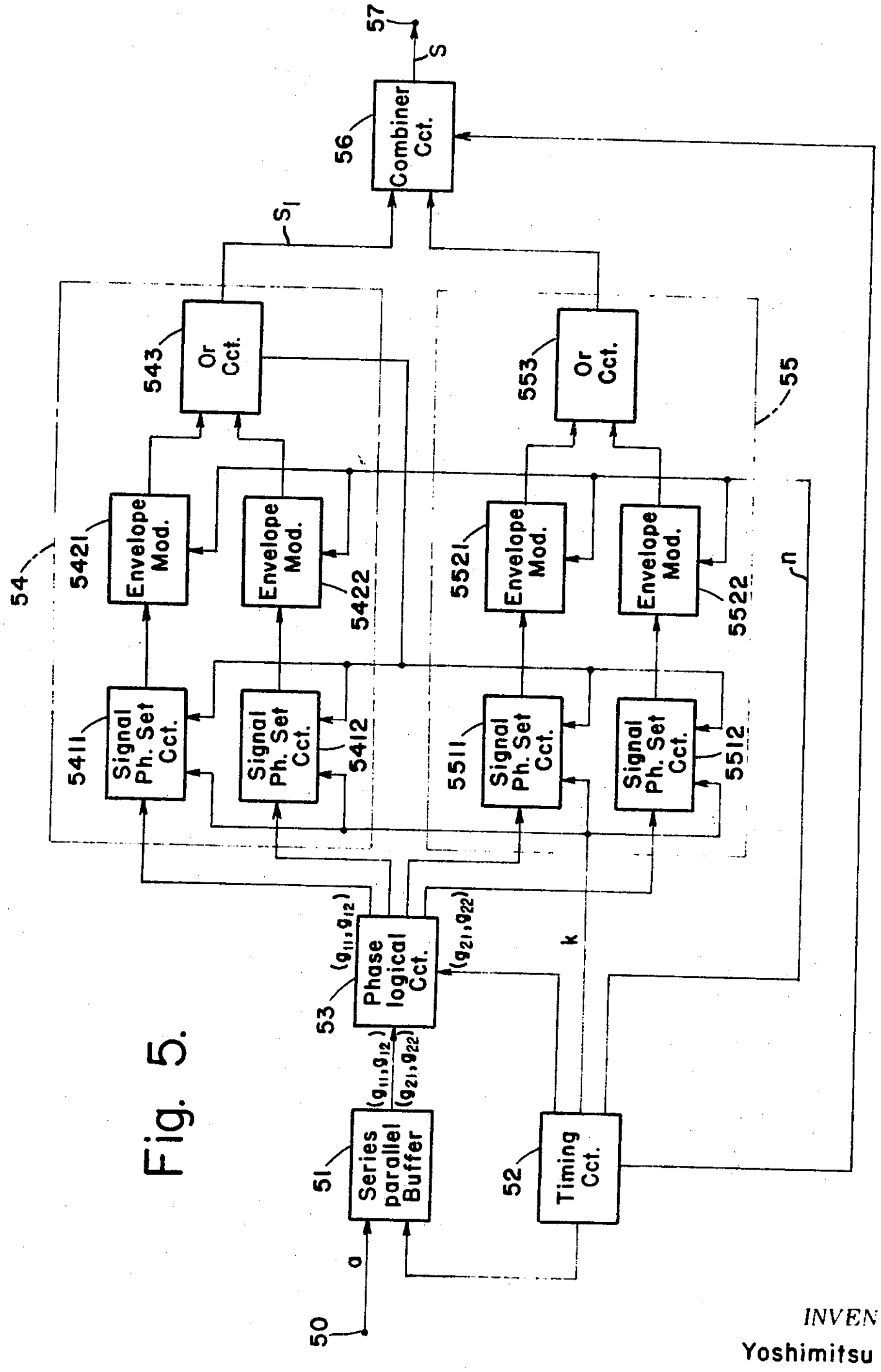
FIG. 5 is a block diagram showing a signal modulator of the system according to the invention.
Figure 6:
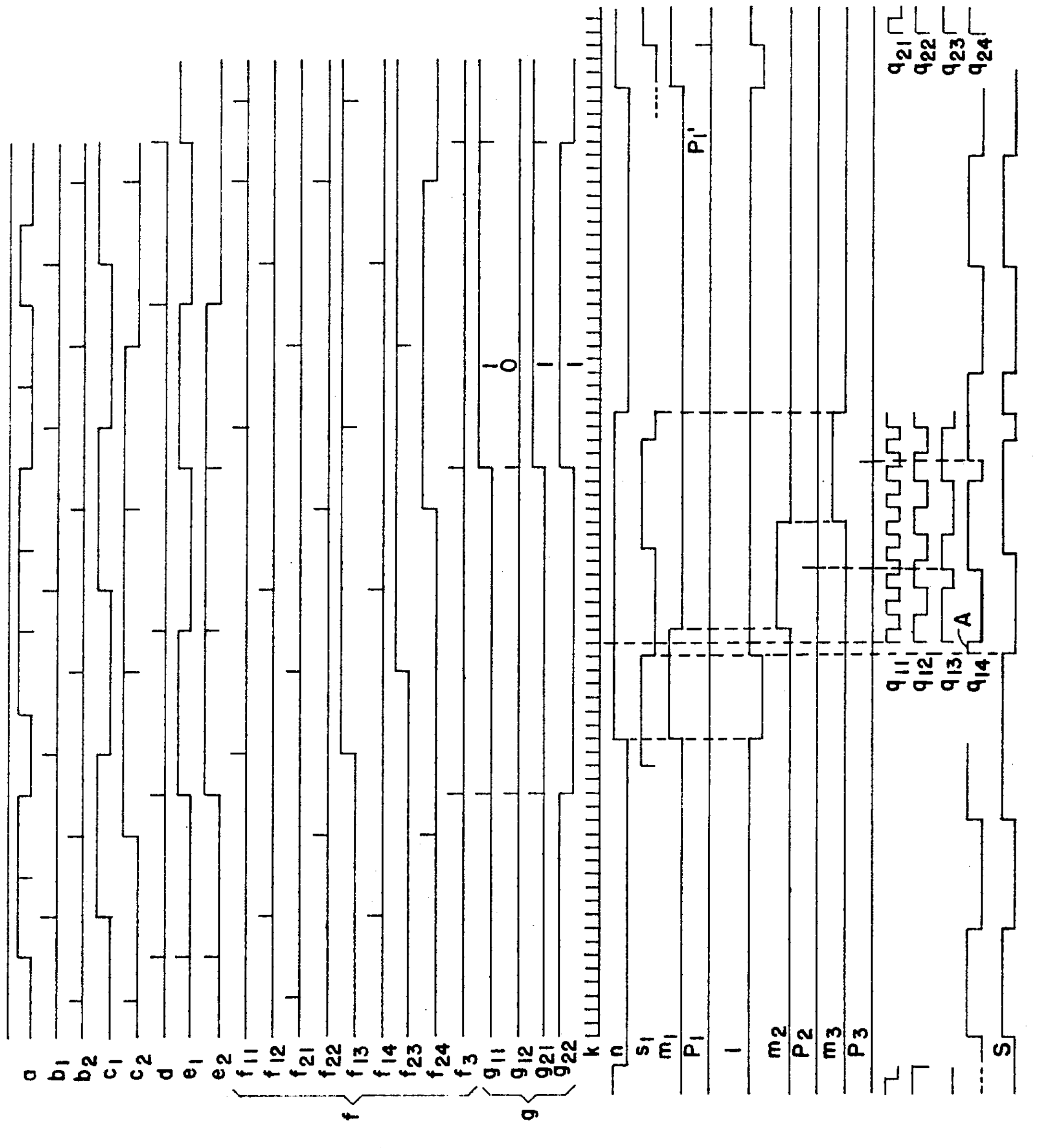
FIG. 6 is a family of waveforms appearing in FIG. 5.

The modulation/demodulation system of this invention will be explained in detail below referring to several circuit diagrams. FIG. 5 is a block diagram showing said modulation system, and FIG. 6 is waveform diagrams thereof. In FIG. 5, the reference numeral 50 denotes an input terminal; 51 a serial-parallel buffer; 52 a timing circuit; 53 a phase logic circuit; 54 and 55 modulators including waveform shaper circuits; and 56 a combiner circuit. In modulators 54 and 55, the numerals 5411, 5412, 5511 and 5512 denote signal phase set circuits; 5421, 5422, 5521, and 5522, envelope modulators; 543 and 553, OR circuits; and 57, an output terminal. A serial binary data input A is applied to the serial-parallel buffer 51 via terminal 50. An example of this input signal is shown in FIG. 6(*a*). This signal is a binary signal of 1101110010 . . ., each binary digit is assumed to be one bit. Also, said serial binary data signal is considered consisting of four bits as one section. (This 4-bit serial binary data signal will hereinafter be referred to as a "4-bit pulse"). This 4-bit pulse which is a serial binary signal is converted into four parallel signals. To do this, the 4-bit pluse is first converted into two binary signals, and each of the binary signals is further converted into two binary signals.

Figure 7:
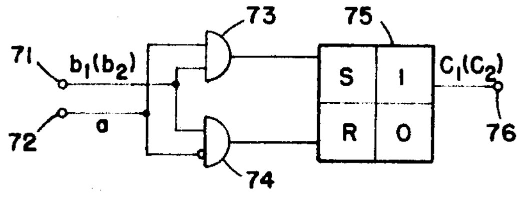
FIG. 7 is a logical diagram showing the separation of a four bit data signal into a pair of dibit signals and usable in FIG. 5.

This serial-parallel buffer 51 can be formed by, for example, a combination of circuits as in FIG. 7. This circuit consists of two AND circuits 73 and 74 and a flip-flop 75. One of two kinds of timing pulses (FIG. 6$b_1$ and 6$b_2$) located nearly in the center of every second bit is applied to terminal 71, and the data input A (4-bit pulse) to terminal 72. A 4-bit pulse input and its polarity-inverted input are applied to AND circuits 73 and 74 for gating these inputs against the timing pulse. The AND output of the 4-bit pulse and the timing pulse, namely, the output of AND gate 73, is used as the trigger for the rise of flip-flop 75, and another AND output, namely, the output of AND gate 74, serves as the trigger for the fall of the flip-flop. As a result, an output as shown in FIG. 6$c_1$ or 6$c_2$ comes out at the terminal 76.

In order to make the phase of the two pulse trains coincident with each other, two circuits as shown in FIG. 7 are used wherein the same timing pulse (FIG. 6*d*) is applied to the terminal 71, and said pulse trains (FIGS. 6$c_1$ and 6$c_2$) are applied to the terminal 72. Thus, two pairs of signals (FIGS. 6$e_1$ and 6$e_2$) whose phases are coincident with each other can be obtained.

In the above manner, a serial binary data input A (4-bit pulse) is converted into two binary signals. In other words, the first 4-bit pulse "1101" (FIG. 6*a*) is converted into $e_1$ and $e_2$; $e_1$ represents the odd turn of bit of the data input A, and $e_2$ its even turn of bit when its initial "O" bits are neglected. Each of the pulse trains as expressed by $e_1$ and $e_2$ will hereinafter be referred to as a "di-bit signal." The two di-bit signals $e_1$ and $e_2$ are each divided into two parallel signals respectively by the serial-parallel buffer 51 whereby four parallel signals are obtained. This process is shown in FIG. 6*f* and 6*g*.

By the use of phase logical circuit 53, among four parallel signals($g_{11}$, $g_{12}$, $g_{21}$, and $g_{22}$ of FIG. 6), the parallel signals (for example, $g_{21}$ and $g_{22}$) corresponding to one dibit signal (for example, $e_2$) are applied in the form of a pulse signal to the phase modulator 55. Similarly, other parallel signals $g_{11}$ and $g_{12}$ are given to the modulator 54. Four-phase phase modulation is applied to a carrier in the phase modulators 54 and 55 using said four parallel signals. To do this, the relationship between the di-bit signals and phase deviations is defined, for example, as shown in Table 2 when the phase of the carrier ($f_b$) which has been set to the phase of the previous bit signal is deviated to 45°, 135°, 225°, or 315°and also 90°, 180°, 270°, or 360°, by two phase modulators 54 and 55.

TABLE 2

| di-bit Signal | 11 | 01 | 00 | 10 |
|---|---|---|---|---|
| Deviation by Phase Modulator 54 | 45° | 135° | 225° | 315° |
| Deviation by Phase Modulator 55 | 360° | 90° | 180° | 270° |

The principle of phase modulation by logical signals (which will be described later) using one modulator 54 will be explained. The logical signals from the phase logic circuit 53 are supplied alternately to two phase set circuits 5411 and 5412. The phase set circuit (for example, 5411) causes the previous bit phase of the carrier to deviate to 45°, 135°, 225°, or 315° ( as in Table 2) according to the kinds of di-bit signal 11, 01, 00, or 01. Then, the phase set circuit enters on-line. Another phase set circuit (5412) operates in the same manner as that of the phase set circuit (5411) by the next 4-bit pulse, and then enters on-line. At this moment, the phase set circuit (5411) which has been on-line becomes offline. The di-bit signal indicating the state of odd turn of bit of the 4-bit pulse will hereinafter be referred to as "preceding di-bit" ($e_1$ signal of FIG. 6), and that indicating the state of even turn of bit of the 4-bit pulse as "succeeding di-bit" ($e_2$ signal of FIG. 6). Since each di-bit signal consists of subsequent pairs of pulses, the pulse preceding among the pair pulses within the period of 4-bit pulse is referred to as a "preceding pulse," and that succeeding among the pair pulses as a "succeeding pulse."

The process performed until one of the phase set circuits being off-line becomes on-line will be described below. As described above, one of the phase set circuits in the two modulators is on-line and the other is off-line. The phase of the carrier of the two phase set circuit being off-line is set to the phase of the output signal of the phase set circuit being on-line, and then the phase is deviated by the next phase logical signals from the phase logical circuit 53. After this operation, the circuit which has been off-line becomes on-line. While, the circuit which has been on-line becomes off-line and , at the same time, this phase set circuit enters the reset state. More specifically, the time during which the circuit is off-line is divided into, for example, three equal periods. Then, in the first one-third period, the phase of the carrier of the phase set circuit being off-line is set to the phase of the carrier (the phase of output of OR circuit 543 as in FIG. 5) modulated by the preceding di-bit. In the next one-third period, the phase of the above phase set carrier is set to the phase of the combined signal by a set signal (which will be described later). In the rest of one-third period, the phase of the phase-deviated carrier is further deviated by the phase logical signal corresponding to the next 4-bit pulse signal, and thus the off-line circuit becomes on-line.

The operation performed during the first one-third period will be described by using waveforms shown in FIG. 6. In this period, the phase of the carrier of phase set circuit 5412 being off-line is set to the carrier phase (for example, the phase of output of OR circuit 543) which has been modulated by the preceding dibit. FIG. 6*k* denotes a clock pulse from the timing circuit 52; 6*n*, a switching pulse whose pulse width is equal to the 4-bit period; and 6$m_1$, a gating pulse whose width is equal to the one-third period, respectively. In this embodiment, the frequency of the clock pulse used for controlling the phase deviation must be at least eight times as high as the carrier frequency, because the minimum amount of deviation is 45° of the phase of the carrier. In this embodiment, the former is set to be 16 times as high as the carrier frequency, so as to increase accuracy thereof. When the data input speed is 4,800 bits/sec, the period of 4-bit pulse should be 1/600 sec. Generally, in a phase modulation system, the band width is equal to that in both side-band amplitude modulation (reference: "Principles of Data Communication" by R. W. Lucky et al., McGraw-Hill, 1968), wherein the carrier is located nearly in the center of the band width, while the ratio of the clock frequency to the data input must be an integer. Hence the clock frequency is chosen to be a common multiple of the frequencies of the carrier and data input. In this embodiment the frequencies are as follows:

| | |
|---|---|
| Band width | 3.4 kHz |
| Carrier | 1.8 kHz |
| Clock frequency | 28.8 kHz |
| Data input | 4,800 bits/sec. |

The ratio of the period 1/600 sec of 4-bit pulse and 1/1,800 sec of the carrier is 3:1.

The time point at which the output of the OR circuit 543 changes its state for the first time after the phase set circuit 5411 has entered on-line should be held. For this purpose, the output of the OR circuit 543, which is exemplified by FIG. 6$s_1$, is differentiated and given a certain amount of lag (a negligible small lag in comparison with the clock period). To prevent influence upon other circuits, this differentiated pulse is taken out as an AND output against the pulse ($m_1$ of FIG. 6)with a width corresponding to the first one-third of the off-line period of the phase set circuit whereby this output comes out in the waveform as shown in 6$p_1$ or 6$p'_1$. Then, in order to set the phase set circuit which has been reset by the differentiated pulse, a signal circuit phase set signal ($l$ of FIG. 6) is provided. AND operation is applied to clock pulses $k$ and $l$, and the resultant output is used to operate the serially connected flip-flops (not shown herein diagrammatically) whereby signals having waveforms $q_{11}$ through $q_{14}$ and $q_{21}$ through $q_{24}$ are obtained. More particularly, by the use of the differentiated pulse 6$p_1$, the first through third stage flip-flops are set to the "O" state and the fourth stage flip-flop is set to the "*l*" state. Then, by the use of the clock pulse succeeding to the differentiated pulse $p_1$, the first stage flip-flop is set to the "*l*" state and the succeeding second through fourth stage flip-flops are changed to that state. The frequency of the pulse train of $q_{14}$ is equal the carrier frequency in the system of this embodiment. As shown in FIG. 6, the phase $q_{14}$ or $q_{24}$ of the carrier in the phase set circuit lags fixedly by 22.5° behind the changing time point of the output $s_1$. (This lag corresponds to the width of the portion A of $q_{14}$.) By the above operation, the phase of the carrier of the phase set circuit 5412 is set to the phase corresponding to the preceding di-bit with a fixed phase lag of 22.5° within the first one-third period.

Now, the method in which phase deviation is applied to the carrier which has been set in the above process, in order to set the carrier to the phase of the preceding bit signal in the second one-third period will be described.

Figures 8A, 8B:
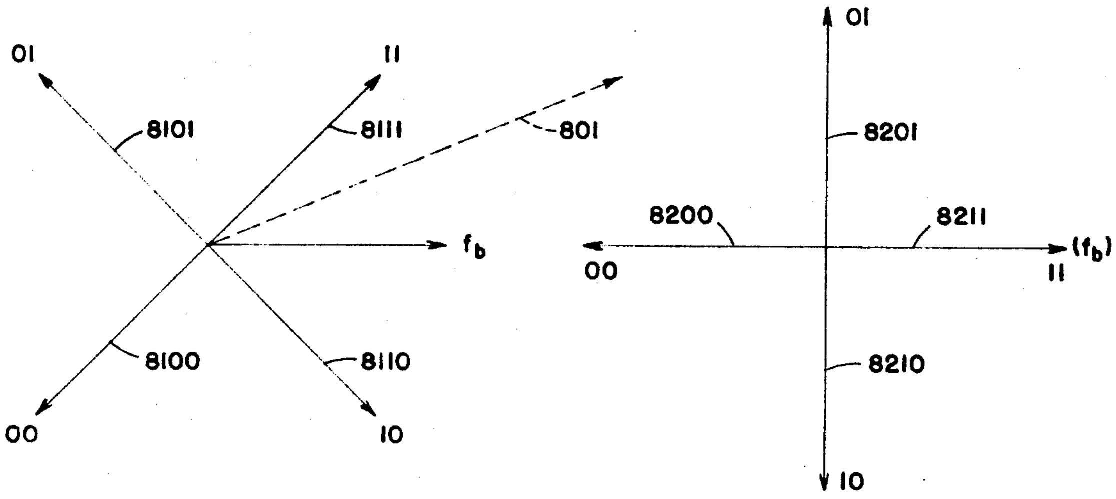
FIGS. 8($a$) and ($b$) are vector diagrams illustrating the relative phase relationships between two phase-modulated signals.

First, the procedure for obtaining the control signal used to set the carrier phase to the phase of the combined signal brought to the on-line state will be explained. Table 2 shows the relationship between values of the phase deviation corresponding to the preceding di-bit and succeeding dibit. This relationship is diagrammatically shown in FIGS. 8(*a*) and (*b*). This diagram indicates the following facts.

i. When the form of a preceding dibit is equal to that of a succeeding dibit, the succeeding dibit lags by 45° behind the preceding dibit.
ii. Referring to a certain form of the preceding dibits (for example, 11), the vector (8201) corresponding to the succeeding dibit whose form is equal to that (01) of the dibit corresponding to the vector (8101) which leads by 90° with respect to the vector (8111) corresponding to said form leads by 45° ahead of the vector (8111) corresponding to said preceding dibit.
iii. Referring to a certain form of the preceding dibit (for example, 11), the vector (8200) corresponding to the succeeding dibit whose form is equal to that (in this case, 00) of the dibit corresponding to the vector (8100) which leads by 180° with respect to the vector (8111) corresponding to said form leads by 135° ahead of the vector corresponding to said preceding dibit.
iv. Referring to a certain form of the preceding dibit (for example, 11), the vector (8210) corresponding to the succeeding dibit whose form is equal to that (in this case, 10) of the dibit corresponding to the vector (8110 which leads by 270° with respect to the vector (8111) corresponding to said form leads by 225° ahead of the vector corresponding to said preceding dibit.

Therefore, if, for example, the preceding dibit on the side of on-line is 11 and the succeeding dibit is 11 as in (i) above, the phase of the carrier of the phase set circuit on the off-line side is set to the vector 8111 in the first one-third period. In the next one-third period, it is necessary to phase deviate this vector to the combined vector 801 of vectors 8111 and 8211. The value of this phase deviation is always −22.5° in the case of (i) above. Similarly, the values of phase deviation in the cases of (ii), (iii) and (iv) are +22.5°, +67.5° and −67.5° respectively. Namely, there are only four kinds of phase deviation values at which the phase of carrier being set to the vector corresponding to the preceding dibit is set to the phase (for example, vector 801 as in (i) above) of the previous bit signal. To this end, accordingly, four kinds of control signal are needed. To provide these control signals in the form of binary codes of two bits, the following logical conversion is required. The final forms obtained from this conversion are shown in Table 3.

TABLE 3

| Form of Preceding dibit (FIG. 6c₁) | Form of Succeeding dibit (FIG. 6c₂) 11 | 01 | 00 | 10 |
|---|---|---|---|---|
| 11 | 11 | 01 | 00 | 10 |
| 01 | 10 | 11 | 01 | 00 |
| 00 | 00 | 10 | 11 | 01 |
| 10 | 01 | 00 | 10 | 11 |

Figure 9:
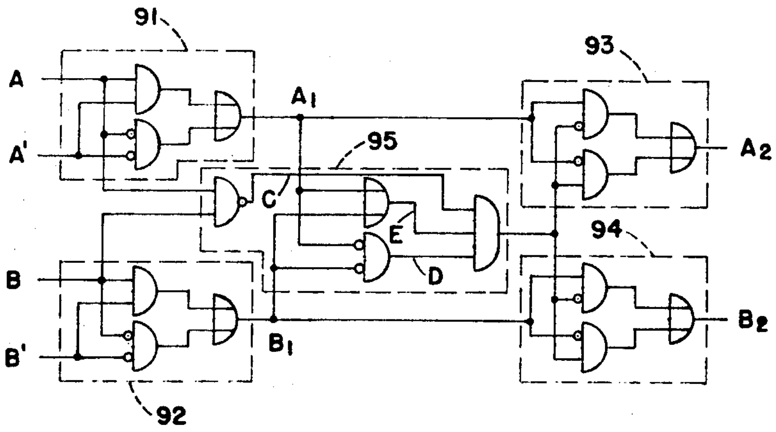
FIG. 9 is a logical diagram showing the signal for setting the carrier phase to the preceding dibit phase in the phase setting of the OFF side signaling circuit in FIG. 5.

This conversion can be realized by the logical conversion circuit as shown in FIG. 9. This circuit consists of four logic circuits 91 through 94 and a polarity control circuit 95. As described above, the dibit signal is converted into parallel signals by the use of serial-parallel buffer. The preceding dibit and succeeding dibit are supplied as parallel signals to the terminals A and B and to the terminals A′ and B′ respectively. When A and A′ are in the same polarity, "1" output appears at $A_1$; while, when B and B′ are in the same polarity, "1" output appears at $B_1$. When A and A′ or B and B′ are in the different polarity, "O" output appears at $A_1$ or $B_1$. Table 4 shows the output at $A_1$ and $B_1$.

TABLE 4

| Form of Preceding dibit (FIG. 6c₁) | Form of Succeeding dibit (FIG. 6c₂) 11 | 01 | 00 | 10 |
|---|---|---|---|---|
| 11 | 11 | 01 | 00 | 10 |
| 01 | 01* | 11 | 10* | 00 |
| 00 | 00 | 10 | 11 | 01 |
| 10 | 10* | 00 | 01* | 11 |

In Table 4 in comparison with Table 3, there are four different values (*marked in Table 4). These can be made equal to those of Table 3 by inverting their polarities. For this inversion, the polarity control circuit 95 is provided. When the polarities of A and B of the preceding dibit (AB) are different from each other, an output signal is generated at point C of the polarity control circuit 95. When the polarities of $A_1$ and $B_1$ are different, output signals are generated at points to D and E of the control circuit 95. When those output signals are given to C, D and E, the control circuit 95 delivers a control output, and the polarities of $A_1$ and $B_1$ are inverted by the logical circuits 93 and 94. When no control signal is given, the signal at $A_1$ and $B_1$ appears directly as the output. Thus, $A_2$ and $B_2$ have the outputs as shown in Table 3.

Then, a method of phase deviation by using said control signal will be explained below. As is wellknown, there is a method of causing phase deviation by controlling serially connected flip-flops. These flip-flops are exemplified by U.S. Pat. No. 3,128,342, particularly by channel A in FIG. 2 thereof. For 45° phase deviation by the use of flip-flops which deliver output waveforms such as $q_{11}$, $q_{12}$, $q_{13}$ and $q_{14}$ of FIG. 6, it is necessary to apply a control pulse to $q_{12}$ (note: the clock pulse $k$ has a period corresponding to 22.5° as described before). Similarly for 90° phase deviation, a control pulse is applied to the flip-flop $q_{13}$; for 135° phase deviation, a control pulse is applied to the flip-flops $q_{12}$ and $q_{13}$; for 180° phase deviation, a control pulse is applied to the flip-flop $q_{14}$. Thus the phase is deviated by inverting the phases of some flip-flops. In the same manner, phase deviations of 225°, 270° and 315° are accomplished. As described by referring to FIG. 6, the phase $q_{14}$ or $q_{24}$ of the carrier in the phase set lags fixedly by 22.5° with respect to the output S. Therefore, when the relationship between the preceding dibit and succeeding dibit is as described in (i), no phase deviation is needed. Namely, the values of phase deviation corresponding to the cases (i), (ii), (iii) and (iv) are 0°, 45°, 90° and −45° respectively. In this way, when the phase of the carrier of the phase set circuit being off-line is set to the phase of the preceding bit signal being on-line, then, in the rest of one-third period, it is set to the phase which is next to be on-line. Further description of this operation is omitted for simplicity since this technique is apparent from that described before.

Figure 10:
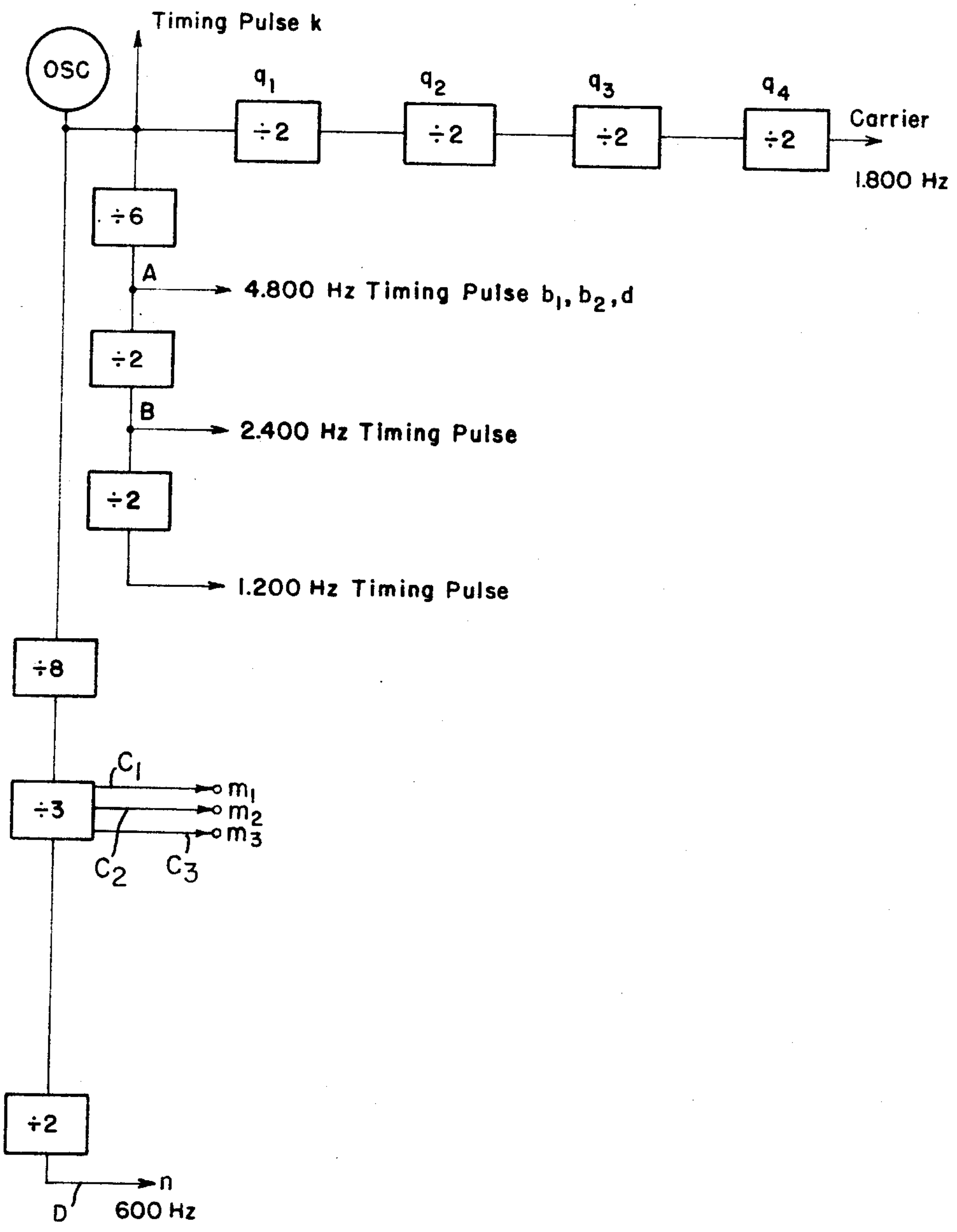
FIG. 10 is a block diagram of a circuit for generating timing signals and a carrier usable in FIG. 5.

The phase modulation is now completed. Then, the waveforms of the modulated signals delivered from the phase set circuits are shaped by envelope modulators 5421, 5422, 5521 and 5522 into approximately sinusoidal waves. As envelope modulators, filters may be used. Since the waveform shaping function of the envelope modulator is described in U.S. Pat. No. 3,128,343, further description thereof is omitted. The outputs of envelope modulators 5421, 5422, 5521 and 5522 are applied to OR circuits 543 and 553 as shown in FIG. 5. The modulated waves after this OR circuit are combined in the adder circuit 56. The timing signal, whose frequency is 600 Hz in this embodiment, for switching the outputs of the modulators 54 and 55 alternately is also combined in this combiner circuit. Since the combined signal is an AC signal, a hybrid circuit may be used for the combiner circuit. The combined signal is delivered to the output terminal 57. FIG. 10 shows a specific example of the timing circuit 52. The timing signals $b_1$ and $b_2$ of FIG. 6 are derived from the point A of FIG. 10, gating pulses $m1$, $m2$, $m3$ and $n$ from the points $C_1$, $C_2$, $C_3$ and D, respectively, and timing signal $d$ from the point B.

Figure 11:
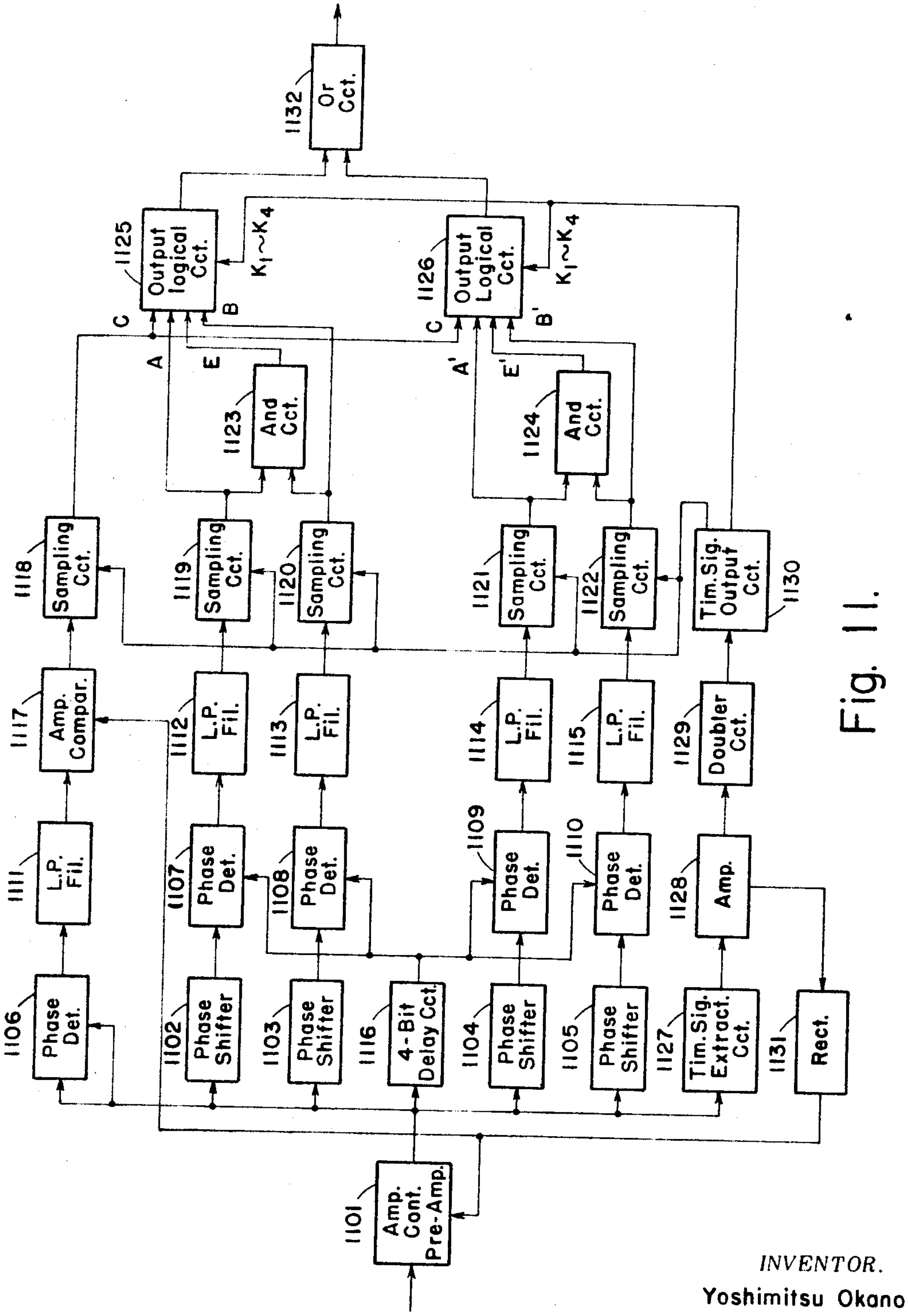
FIG. 11 is a block diagram illustrating a demodulator according to a specific embodiment of the invention and usable with FIG. 5.

FIG. 11 shows a demodulator embodying this invention, wherein the phase-modulated signal transmitted according to the foregoing modulator in FIG. 5 is demodulated by the use of the foregoing principles. In FIG. 11, the reference numeral 1101 denotes an automatic amplitude controlling pre-amplifier; 1102, 1103, 1104 and 1105 are phase shifters of 22.5°, −67.5°, −22.5° and 67.5° respectively; 1106 through 1110 are phase detectors; 1111 through 1115 are low-pass filters, 1116 is a 4-bit delay circuit (4-bit delay means the delay of said 4-bit pulse period); 1117 is an amplitude comparator using differential amplification; 1118 through 1122 are sampling circuits; 1123 and 1124 are AND circuits; 1125 and 1126 are output logic circuits; 1127 is a timing signal extracting circuit; 1128 is an amplifier; 1129 is a frequency doubler circuit; 1130 is a timing signal output circuit; 1131 is a rectifier circuit; and 1132 is an OR circuit. The automatic amplitude controlling pre-amplifier 1101 is for amplifying the signal sent from the transmitting station and for maintaining its output at a certain specific level. Since the ratio of the level of the data signal to that of the timing signal is kept constant, the timing signal sent together with the data signal is extracted by the timing signal extracting circuit 1127, amplified linearly by the amplifier 1128, rectified by the rectifier circuit 1131, and fed back to the amplifier 1101, thus automatic voltage control is performed so that the level of the timing signal which has been extracted by the extracting circuit 1127 is kept constant. By this operation, the level of this data signal is kept constant. The timing signal frequency is set at a frequency not included in the data signal so as to prevent influence upon the latter signal. For example, when the carrier frequency of the signal is 1,800 Hz and the modulation speed is 1,200 baud, the timing signal frequency is 600 Hz.

The output signal of the automatic amplitude controlling pre-amplifier 1101 is applied to the 4-bit delay circuit 1116, phase detector 1106, and phase shifters 1102 through 1105. The output signal of the 4-bit delay circuit 1116 is used as 4-bit ahead input signal which is the reference signal for the phase detection. The phase shifters 1102 through 1105 are to shift the phase of those input signal by 22.5°, −67.5°, −22.5° and 67.5°, respectively. The phase detectors 1107 through 1110 are to detect whether the phase difference between the signal given from each phase shifter and the reference signal is 45°, 135°, 225° or 315°. The DC components (positive, negative and zero signal) from the detectors are filtered by the low-pass filters 1112 and 1115. The sampling circuits 1119 through 1122 are operated to sample the filtered DC signals by the use of a timing pulse with the modulation speed sent from the timing output circuit 1130. The phase detector 1106 is a square detector which does phase detection on the input signal itself. The signal detected by this detector contains the DC component shown in Equation (6). The low-pass filter 1111 filters this DC component. The amplitude of this DC component is compared with that of the reference DC component delivered from the rectifier 1131 by the amplitude comparator 1117, and the resultant DC output is sampled in the sampling circuit 1118 using the timing pulse with the modulation speed sent from the timing output circuit 1130. As described, one of the outputs of the sampling circuits 1119 through 1122 is always zero output. (Refer to Table 1.) This zero output of one of the sampling circuits brings one of the AND circuits 1123 and 1124 and one of the logical circuits 1125 and 1126 into "off" state. The outputs of a Pair of the sampling circuits connected to the AND circuit in the non-off state are applied, together with the output (amplitude information) of the sampling circuit 1118, to the logic circuit 1125 or 1126, whereby the same serial binary data signal as the input signal on the transmission side is obtained. (Details of this method will be described later). Thus, the outputs of logical circuits 1125 and 1126 are combined in the OR circuit 1132 and delivered as the output.

Figure 12:
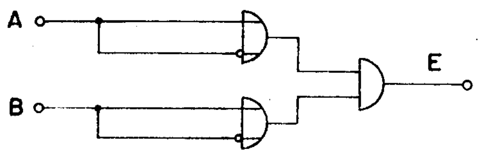
FIG. 12 is an AND circuit in the demodulator in FIG. 5.

Several circuits in FIG. 11 will be explained showing these detailed examples. FIG. 12 shows an example of AND circuit 1123 (same for 1124). A and B are the inputs from the sampling circuits 1119 and 1120, and E is the output of this circuit in FIG. 12. It is apparent that when both A and B are not zero, a "l" output is given.

Figure 13:
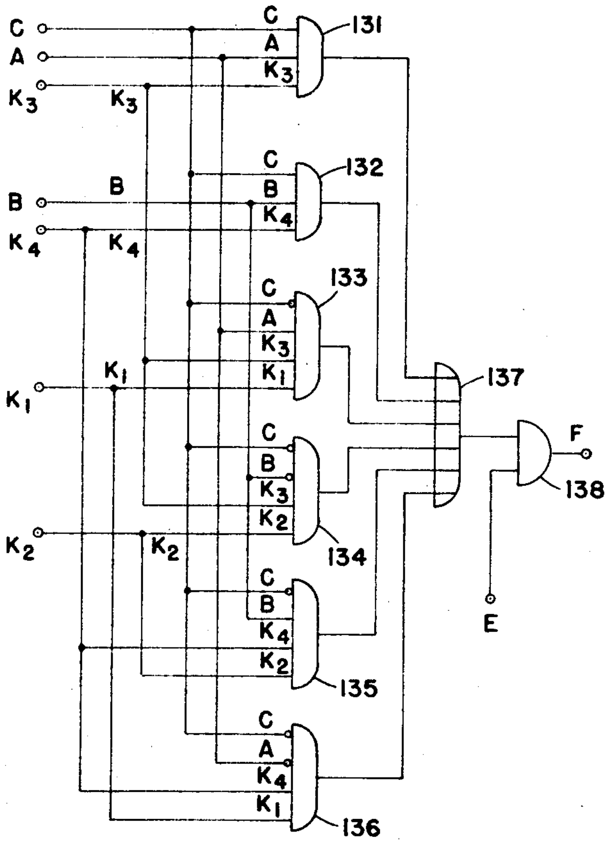
FIG. 13 is an output logic circuit usable in FIG. 11 for converting a phase modulated signal into a serial binary signal.
Figure 14:
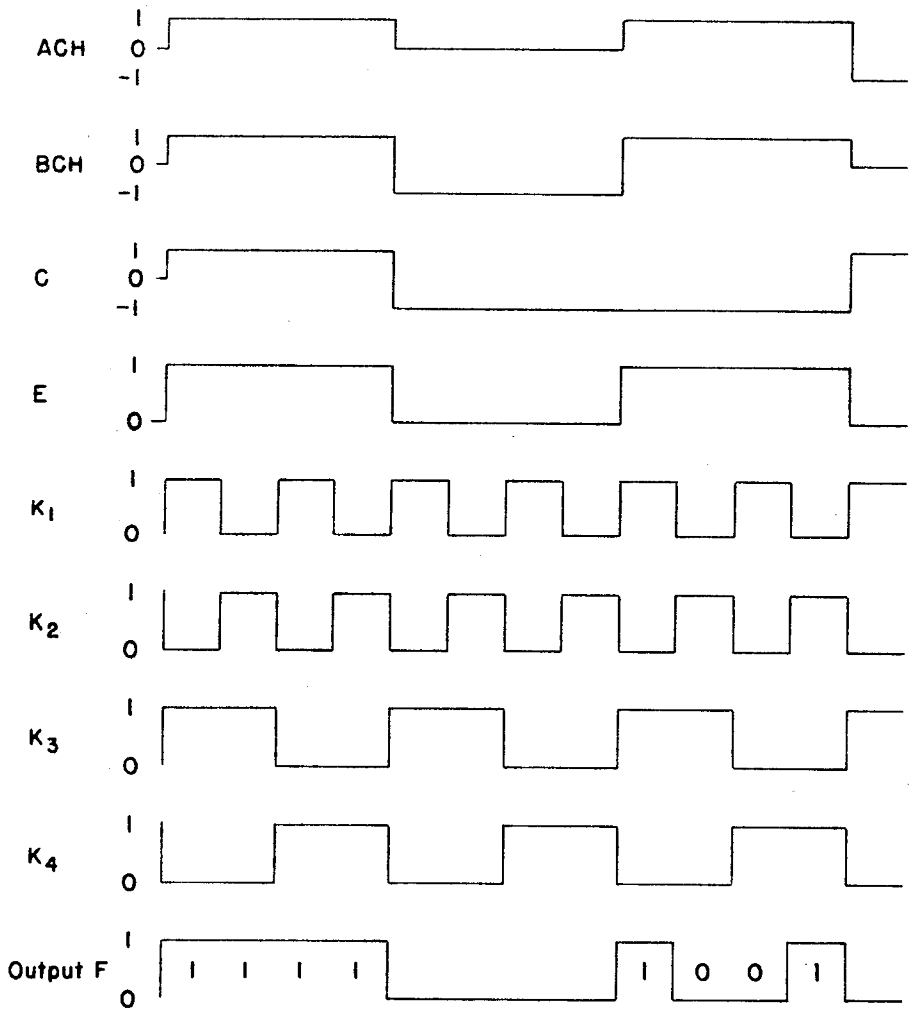
FIG. 14 shows a family of waveforms applicable to FIG. 13.

An example of logical circuit 1125 is shown in FIG. 13, and waveforms of individual circuits are shown in FIG. 14. A and B denote examples of the input signals from the sampling circuits 1119 and 1120; C, an example of the input signal from the sampling circuit 1118; and E, an example of the input signal from the output of AND circuit 1123. $K_1$, $K_2$, $K_3$ and $K_4$ are the input signals from the timing output circuit 1130. $K_1$ and $K_2$ are square waves (600 Hz) having the same repetition frequency as the serial binary signal communication speed of the input signal of the transmission system in FIG. 5; the polarities of these square waves are reverse to each other. $K_3$ and $K_4$ have one half of the frequencies of $K_1$ and $K_2$, respectively. According to Tables 1 and 2 or FIG. 8, the relation-ship between 4-bit pulse and A, B, and C signals should be as shown in Table 5.

TABLE 5

| A, B | C Large (positive | Small (negative) |
|---|---|---|
| ++ | 1111 | 1001 |
| −+ | 0011 | 1010 |
| −− | 0000 | 0110 |
| +− | 1100 | 0101 |

For example, when C is large (positive) and B is positive, $\phi_{1i} = 135°$ and $\phi_{2j} = 90°$ according to Table 1. Therefore the preceding bit is 01, and the succeeding bit is 01. Then, the 4-bit pulse obtained by combining these bits must be 0011.

FIG. 13 shows the circuit which satisfies the requirement of Table 5. Numerals 131 through 136 and 138 denote AND circuits; and 137, an OR circuit. As shown in FIG. 14, when A is positive and B is positive and C is also positive, C, A and $K_3$ are subjected to AND operation at AND circuit 131 to give an output 1100. At the same time, the AND circuit 132 takes "AND"logic of C, B and $K_4$ to give another output 0011. Accordingly, the output of OR circuit 137 is 1111. Likewise, when A is positive and B is positive and C is negative, the AND circuit 133 produces an output 1000, as its "AND" output of $\bar{C}$, A, $K_3$ and $K_1$. At the same time, the AND circuit 135 delivers an output 0001 taking "AND" of on $\bar{C}$, B, $K_4$ and $K_2$. Therefore, the output of OR circuit 137 is 1001. The output of OR circuit 137 is subjected at the AND circuit 138 to "AND" logic operation with the on-off switching signal E, whereby an output F is obtained.

Figure 15:
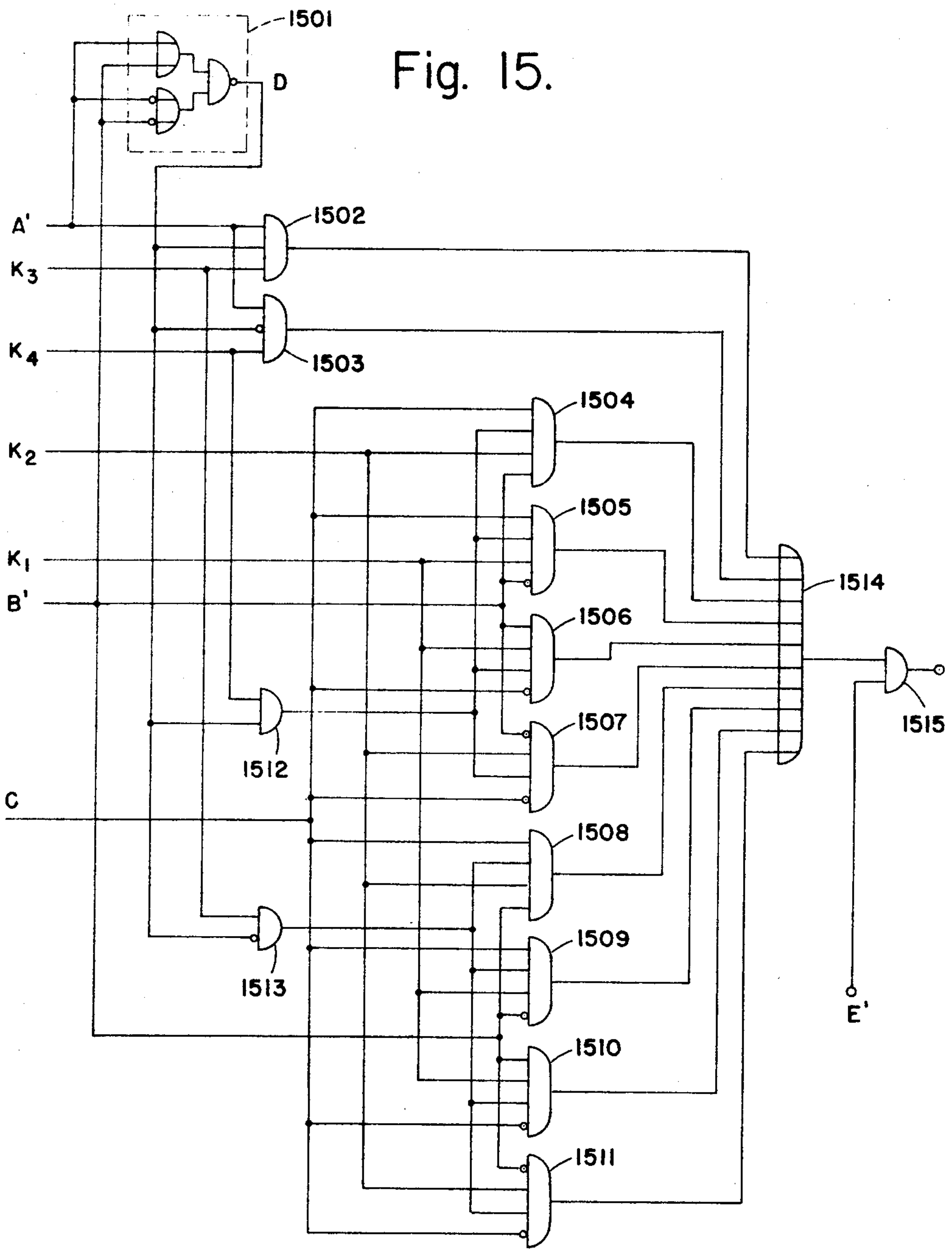
FIG. 15 is an output logic circuit usable in FIG. 11 for converting a phase modulated signal into a serial binary signal.
Figure 16:
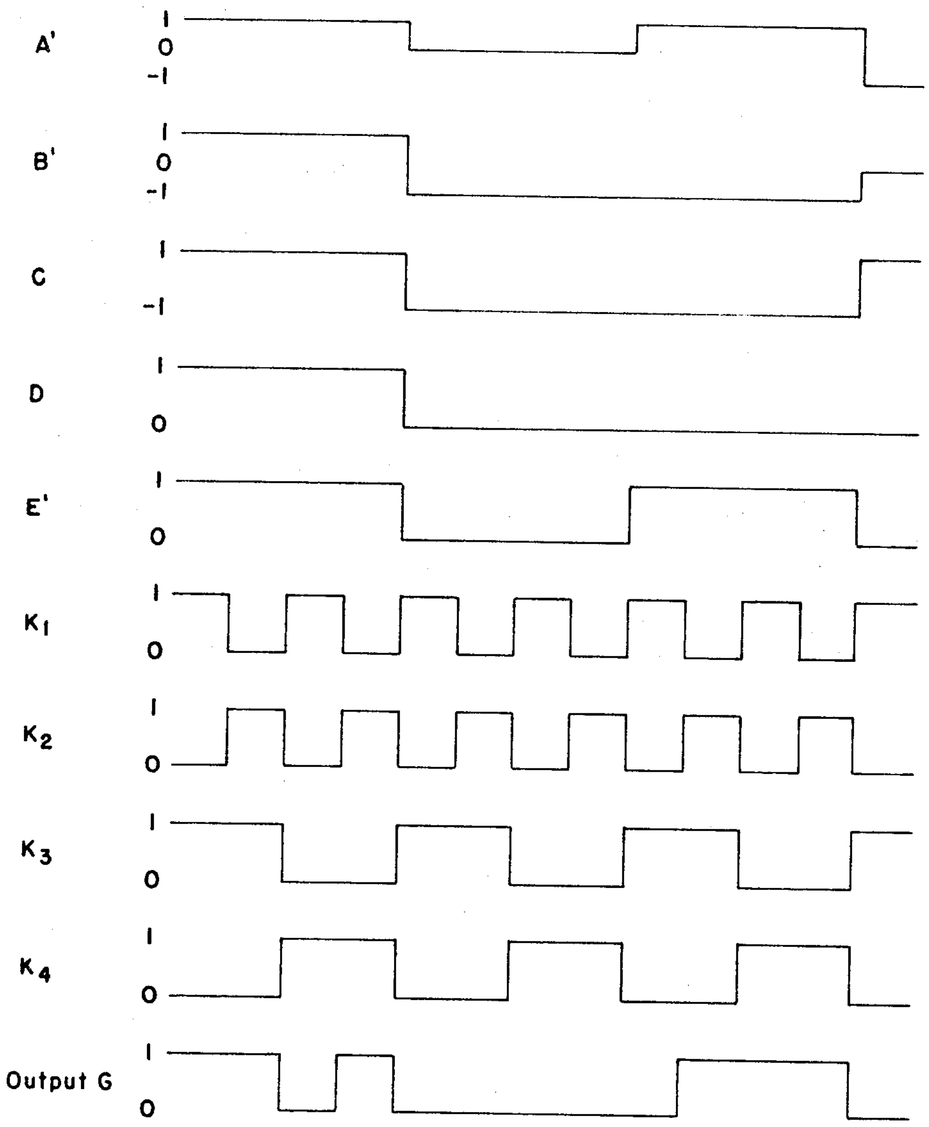
FIG. 16 shows a family of waveforms applicable to FIG. 15.

The other logic circuit 1126 of FIG. 11 can be realized by the circuit as shown in FIG. 15. The numeral 1501 indicates a logic circuit; 1502 through 1513 and 1515, AND circuits; and 1514, an OR circuit. The waveforms of these logic circuits are shown in FIG. 16. References A′ and B′ denote input signals from the sampling circuits 1121 and 1122; and E′, an input signal from the AND circuit 1124. As in the case of Table 5, Table 6 shows the relationship between A′, B′, C signals and 4-bit pulse.

TABLE 6

| A′, B′ | C Large (positive) | Small (negative) |
|---|---|---|
| +− | 1011 | 0111 |
| −− | 0010 | 0001 |
| −+ | 0100 | 1000 |
| ++ | 1101 | 1110 |

For example, when C is positive and A′ is positive and B′ is also positive, the output D of logical circuit 1501 becomes 1, because A′ and B′ have the same polarity. The AND circuit 1502 produces 1100, as an "AND" output of A′, D and $K_3$. At the same time, the AND circuit 1512 produces 0011 as "AND" of $K_4$ and D. When this output 0011 and C and $K_2$ are AND-gated by the AND circuit 1504, the output becomes 0001. By these signals, the output of OR circuit 1514 becomes 1101.

Assuming that $m$ sets of bit-parallel signals are derived, each comprising $l/m$ bits. There will be $m$ phase modulated carriers with phase deviations $\phi_m$ to $\phi_{mn}$, repectively, each of which can have $n$ different values as explained below. The modulations are effected on a single common carrier wave cos $w_ct$, and that $m$ sets of phase-modulated signals are combined, the characteristics of this combined signal will now be described. The technique of demodulating this combined signal is substantially the same as that described in the foregoing.

The combined wave $fmn^{(t)}$ of $m$ sets of phase-modulated signals is given by the following equation:

$$f_{MN}(t)=\sum_{1=1}^{m} k_i \cos(w_ot+\phi_{iN}) \quad (8)$$

Where $k_i$ denotes the amplitude of $i$-th phase-modulated wave ($0<i \quad m$).

First, the instance that two sets of phase-modulated waves are combined is considered. Then, the combined signal is given by:

$$f_{2n}(t) = k_1\cos(w_ct + \phi_{1n}) + k_2 \cos(w_ct + \phi_{2n}) \ldots \quad (9)$$

This equation can be reduced to:

$$f_{2n}(t) = g(\phi_{1n}, \phi_{2n}) \cos\{w_ct + \phi(\phi_{1n}, \phi_{2n})\} \ldots \quad (10)$$

In this equation, $g(\phi_{1n}, \phi_{2n})$ and $\phi(\phi_{1n}, \phi_{2n})$ are given by:

$$g(\phi_{1n}, \phi_{2n}) = \sqrt{k_1^2 + k_2^2 - 2k_1k_2\cos(\phi_{1n} - \phi_{2n})} \ldots \quad (11)$$

$$\phi(\phi_{1n}, \phi_{2n}) = 1/2(\phi_{1n} + \phi_{2n}) - \tan^{-1}(k_1 - k_2/k_1 + k_2) \tan 1/2 (\phi_{1n} - \phi_{2n}) \ldots \quad (12)$$

Hence, $\phi(\phi_{1n}, \phi_{2n})$ can be expressed as follows $$\phi(\phi_{1n},\phi_{2n}) = \alpha_1\phi_{1n} + \alpha_2\phi_{2n} \ldots \quad (13)$$

Where $\alpha_1$, $\alpha_2$ denote constants ($\alpha_1 + \alpha_2 = 1$) Since $\phi_{1n}$ or $\phi_{2n}$ represents one of $n$ steps of phase shift angles of the phase-modulated signals, these angles can be expressed by the following equation assuming that $i_1 + i_2$ are integers:

$$\phi_{1n} = \phi_{10} + i_1(2\pi/n) \ (0 \leq i_1 < n) \ldots \quad (14)$$

$$\phi_{2n} = \phi_{20} + i_2(2\pi/n) \ (0 \leq i_2 < n)$$

($\phi_{10}$ and 100 $_{20}$ are certain definite deviation angles being different from each other.)

Now, how much amplitude information the amplitude $g(\phi_{1n}, \phi_{2n})$ of the combined signal can have will be studied. The amplitude $g(\phi_{1n}, \phi_{2n})$ is a function of a variable ($\phi_{1n} - \phi_{2n}$) and also a periodic function based on $2\pi$. Therefore, it is necessary to study how many kinds of values the variable $(\phi_{1n} - \phi_{2n})$ can assume within the range of $2\pi$.

On the other hand, $$\phi_{1n} - \phi_{2n} = \phi_{10} - \phi_{20} + (i_1 - i_2)\, 2\pi/n = \phi_{10} - \phi_{20} + i\,(2\pi/n) \ldots \quad (15)$$

Also the value $i = i_1 - i_2$ is an integer ranging from 0 to $(n - 1)$ within the variable range of $2\pi$. This means that Equation (15) can assume $n$-number of different values within the variable range of $2\pi$.

While, $g(\phi_{1n}, \phi_{2n})$ is an even function of $(\phi_{1n} - \phi_{2n})$ and accordingly, if there is the following relationship between $n$ discrete values of $(\phi_1 - \phi_2)$, $$(\phi_{1n} - \phi 2n)i = i' = -(\phi_{1n} - \phi_{2n})i = i'' \ldots \quad (16)$$

the values of $g(\phi_{1n}, \phi_{2n})$ corresponding to the individual variables become equal to each other, and the values of $g(\phi_{1n}, \phi_{2n})$ is reduced corresponding to the portion of said equal values. How the condition of Equation (16) is raised will be studied. From Equations (14) and (16), $$\phi_{10} - \phi_{20} + i'\,(2\pi/n) = -(\phi_{10} - \phi_{20} + i''\,(2\pi/n)$$

where $i \neq i''$

Therefore, $$i' + i'' = [2(\phi_{10} - \phi_{20})/(2\pi/n)] \ldots \quad (17)$$

While, generally, $$|\phi_{20} - \phi_{10}| < 2\pi/n$$

From this condition and Equation (17), it is known that Equation (17) will be established if the following requirement is satisfied.

$$2|\phi_{20} - \phi_{10}| = 2\,\pi/n \ldots \quad (18)$$

In this case, the number of different values of $g(\phi_{1n}, \phi_{2n})$ will be $n/2$ (If $n$ is an odd number, it is $(n + 1)/2$ instead of $n/2$).

How many kinds of signal information the phase $\phi(\phi_{1n}, \phi_{2n})$ of the combined signal can have will now be discussed. The number of amplitude information is assumed to be $n$. In this case, Equation (15) can assume $n$ values. When $i$ is considered fixedly as $i - i_2 = i_2 = i_0$, the following equations are obtained from Equation (14).

$$\phi_{1n} = \phi_{10} + (i_0 + i_2)\, 2\pi/n$$

$$\phi_{2n} = \phi_{20} + i_2\, 2\pi/n$$

Substituting above $\phi_{1n}$ and $\phi_{2n}$ for Equation (13), $$\phi(\phi_{1n}, \phi_{2n}) = \alpha_1\phi_{10} + \alpha_2\phi_{20} + i_0\alpha_1 \cdot 2\pi/n + i_2 \cdot 2\pi/n$$

Therefore, when $i_0$ is fixed to a certain value and $i_2$ changes from 1 to $n$, $\phi(\phi_{1n}, \phi_{2n})$ can assume $n$ values. Accordingly, the number of phase information as a whole is $n \times n = n^2$.

When the number of amplitude information is $n/2$ (or $n + 1/2$), on the contrary, said $i_0$ assumes two different values $i'_0$ and $i''_0$ corresponding to one amplitude information. Each of $i'_0$ and $''_0$ assumes $n$ discrete steps of phases and, hence, $2n$ phase information can be obtained. Therefore, $2n \times n/2 = n^2$ number of phase information can be obtained as a whole.

When $m$ set of $n$ sets of phases phase-modulated signals are combined, $g(\phi_{1n}, \phi_{2n}, \ldots, \phi_m)$ has $m \times n$ or $m \times n/2$ information signals, and $\phi(\phi_{1n}, \phi_{2n}, \ldots, \phi_m)$ has $m \times n^2$ phase information.

As has been explained, $m$ set of $n$ sets of phases phase-modulated signals are produced from the carrier whose phase is equal to that of the combined signal of preceding signal, and these modulated signals are combined and transmitted. Then, by detecting the amplitude deviation, the combined signal is divided into $m$ sets of signals each of which includes $n$ or $2n$ phase deviation informations. For $n$ phase deviation informations, conventional $n$ steps of phases detection system can be used. For $2n$ phase deviation informations, the signal is divided into two kinds of $n$ phase informations, and detected by $n$ steps of phases phase detection system in the manner as described previously. The method of dividing $2n$ phase information into two $n$ phase information is such that, as described, this signal is phase-deviated to two pairs of by which the combined signal is considered to be composed (in this example, the deviations are ±22.5°, ±67.5°) by using one of the two pairs of signals as a reference signal, the remainder of the two pairs of signals is phase-detected. Thus, according to the combination of those detected results, $m$ sets of $h$ steps of phase modulation/demodulation can be accomplished.

Figure 17:
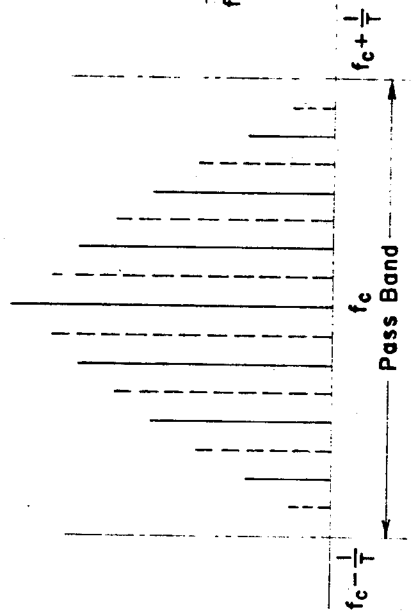
FIG. 17 is a frequency spectrum distribution diagram of a phase modulator in accordance with the embodiment in FIG. 5.

According to this invention, high speed data transmission can be realized by making the effective use of frequency band width. The effective use of frequency band means that signal energy is effectively transmitted through a certain specific frequency band width whereby signal transmission quality is increased. In the phase modulation shown as an example, when a certain definite phase deviation is done sequentially, the spectrum appearing at one phase modulator and the value of this spectrum are shown by the dotted line or full line in FIG. 17. The spectrum and its value appearing when two phase modulators are used are the combination of the dotted line and full line. This means that, when two phase modulators are used, the transmittable effective signal energy is twice as much as that in the case one phase modulator is used. Thus twice as much information is transmitted.

Effective use of frequency band will more particularly be explained by referring to frequency spectrum distribution caused by the phase deviation. Described below is how frequency distribution will become when the phase of the carrier is deviated sequentially with a certain angle deviation. Next, the frequency distribution will be drawn by a statistic procedure where the phase of the carrier is deviated at random. Furthermore, the frequency distribution formed when the phase is deviated to a certain definite angle will be studied.

Assuming that a carrier having angular frequency $w_c$ and amplitude 1 is phase-shifted by $\phi$ in each T-second, the wave form will be analysed. The frequency distribution thereof can be obtained through this analysis.

Generally, the following relationship exists in the data transmission as regards phase $\phi$.

$$2\,\pi/\phi = a/b \ldots \quad (19)$$

(where $a$ and $b$ are integers excluding zero, to be prime to each other.)

Assuming that time is $t$, and the initial phase is $\phi$, then said waveform F($t$) is expressed by $$F(t)=\sum_{n=-\infty}^{\infty}\frac{\sin\left(\frac{b}{a}+n\right)\pi}{\left(\frac{b}{a}+n\right)\pi}\times\cos\left[\left\{w_c+\frac{\phi}{T}\left(1+\frac{an}{b}\right)\right\}t-\frac{(b+an)}{a}\pi+\varphi\right] \quad (20)$$

From Equation (20), the frequency distribution is given in line spectrum as expressed by the following equation:

$$f(n)=f_c+\phi/2\pi T\ (1+an/b)\ldots \quad (21)$$

(where $n$ is an integer, and $f_c$ is the carrier frequency)

The amplitude of the spectrum for each frequency of Equation (21) is given by:

$$A(n)=\left|\frac{\sin\left(\frac{b}{a}+n\right)\pi}{\left(\frac{b}{a}+n\right)\pi}\right| \quad (22)$$

Since 1/T is considered to be a modulation speed from Equation (21), the expansion width of the frequency spectrum caused by phase modulation in data transmission is determined by the phase-deviation angle $\phi$ and modulation speed 1/T, and the amplitude thereof shows line spectrum distribution determined by the well-known (sin X)/X curve according to Equation (22).

Generally, in the data transmission system using phase modulation, the frequency band width is determined by the modulation speed and is the same as that of carrier suppression both sideband amplitude modulation. (Reference: "Principle of Data Communication" by R. W. Lucky and others, McGraw-Hill, 1968). Therefore, when transmission speed is taken as 1/T, the pass band width B will be in the range given by:

$$B=(f_c-1/T)\sim(f_c+1/T)\ldots \quad (23)$$

To find the frequency of Equation (21) which is within the range of Equation (23), Equation (21) is rearranged as follows according to Equation (19):

$$f(n)=f_c+1/T\ [(b/a)+n)]\ [=f_c+1/T\ (\phi/2\pi+n)]\ \ldots \quad (24)$$

Therefore, the only two following frequencies exist within the pass band:

$$f(-1)=f_c-(1/T)\ (a-b)/a\ [=f_c+(1/T)(2\pi-\phi/2\pi)]\ \ldots \quad (25)$$

$$f(0)=f_c+1/T\times b/a\ [=f_c+(1/T)\times(\phi/2\pi)] \quad (26)$$

(Generally, $2\pi>\phi>0$ and, accordingly, $a>b>0$)

Figure 18:
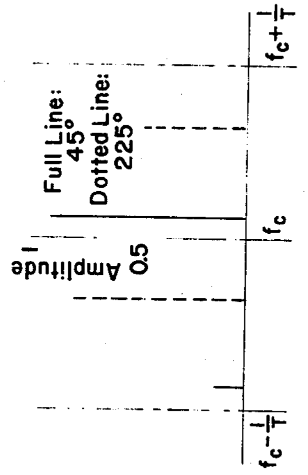
FIG. 18 is a frequency spectrum distribution for illustrating the operation of 45° and 225° phase deviations.

In other words, it can be considered that the frequencies used in phase deviation have only two portions within the whole of the band width. FIG. 18 shows this relationship (namely, a frequency distribution when, for example, phase deviations are 45° and 225°).

Now, based on the above analysis, from the frequency spectrum when phase-modulated signal is handled statistically, the frequency spectrum when the phase deviations are a certain definite angle will be explained.

It is assumed with the phase deviation statistically handled that all the changeable phase deviations occur with the same probability, its spectrum density function is expressed by the following equation (Reference: "Data Transmission" by R. Bennet et al., published by the McGraw-Hill Book Company, 1965):

$$W(f)=1/2T\ [\ |H(f-f_c)|^2+|H(f+f_c)|^2\ ]\cdots \quad (27)$$

Then, H($f$) is as follows:

$$H(f)=\sin\ [(\pi(f/T)/\pi f\ldots \quad (28)$$

From Equations (27) and (28), the frequency spectrum distribution for statistical analysis is also centered at the carrier frequency, and its amplitude is a spectrum having (sin X)/X curve as its envelope. The condition wherein all the changeable phase deviations occur with the same probability is equivalent to the condition wherein all the phase deviations are done simultaneously, and spectra attributable to individual deviations are combined with each other. Thus, it can be considered that the frequency distribution by each frequency deviation is expanded out, centering the two line spectra which has previously been illustrated, and that the combined sum of individual spectra will be given in the form of (sin X)/X.

It is assumed that when a certain definite angle of phase deviation occurs, its principle spectra are to be concentrated at two places in the band width used. Then, one idea of making effective use of one band width is proposed. Namely, to realize this idea, the concentrated frequency distributions are increased to be located at 4, 6, . . . , 2$m$ positions, in addition to said two positions. In other words, this method is such that $m$ sets of phase-modulated signals are combined, transmitted and received; in short, this is the system according to this invention.

What is claimed is:

1. A phase modulation data transmission system, comprising a transmitter including:

a source of a data input serial binary signal consisting of a predetermined number of bits occurring at a preselected repetitive frequency;

a generator of a plurality of timing signals;

means connected to said source and generator and responsive to first and second of said timing signals for converting said predetermined number of input serial bits into a corresponding number of parallel signals, each pair of said serial bits being converted into one pair of said parallel signals;

first and second phase set circuits having inputs connected to first and second outputs, respectively, of said converting means for utilizing a first pair of said parallel signals under control of a third of said timing signals to provide predetermined different amounts of phase shift in first and second portions, respectively, of a carrier signal having a preassigned frequency to represent corresponding first and second bits in said input serial binary signal;

third and fourth phase set circuits having inputs connected to third and fourth outputs, respectively, of said converting means for utilizing a second pair of said parallel signals under control of said third timing signal to provide further predetermined different amounts of phase shift in third and fourth portions, respectively, of said carrier signal to represent corresponding third and fourth bits in said input serial binary signal;

first and second envelope modulators having inputs connected to outputs of said first and second phase set circuits, respectively, for shaping said phase shifted first and second carrier signal portions into approximately sine waves under control of a fourth of said timing signals;

third and fourth envelope moduators having inputs connected to outputs of said third and fourth phase set circuits, respectively, for shaping said phase shifted third and fourth carrier signal portions into approximately sine waves under control of said fourth timing signal;

first and second OR circuits, each having first and second inputs and an output; said first OR circuit first and second inputs connected to outputs of said first and second modulators, respectively; said second OR circuit first and second inputs connected to outputs of said third and fourth modulators, respectively; and combiner circuit means having inputs connected to said first and second OR circuit outputs and including an output terminal for combining at said output terminals said output terminals said first through fourth carrier signal portion sine waves as derived from said first and second OR circuit outputs to represent said first through fourth bits in said input serial binary signal; said combiner circuit means also combining at said output terminal a fifth timing signal identical with said fourth timing signal;

and a receiver for receiving said combined first through fourth carrier signal portion sine waves and said fifth timing signal from said combiner means output terminal to derive from said last-mentioned waves and signal an output data serial binary signal having said input serial binary signal predetermined number of bits as a reproduction of said input data serial binary signal having said predetermined number of bits; said receiver comprising:

amplifying means having an input connected to said combiner means output terminal for amplifying said sine waves and fifth timing signal received therefrom;

timing signal extracting means having an input connected to an output of said amplifying means for deriving from said amplified fifth timing signal a direct current control signal which is produced in an output of said extracting means and applied to another input of said amplifying means to maintain said amplified waves and fifth timing signal at a certain level;

first and second phase shifters having inputs connected to said amplifying means output for further shifting by first and second preselected different fixed amounts the phase of said amplified sine waves to provide further phase shifted sine waves;

third and fourth phase shifters having inputs connected to said amplifying means output for further shifting by third and fourth preselected different fixed amounts the phase of said amplified sine waves to provide further phase shifted sine waves;

delay circuit means having an input connected to said amplifying means output for providing a time delay equal to four of said input signal bits in said amplified sine waves to produce a reference phase signal;

first and second phase detectors having inputs connected to outputs of said first and second phase shifters, respectively, and an output of said delay means for detecting the phase difference between said further phase shifted sine waves in said outputs of said first and second phase shifters, respectively, and said time delayed sine waves to produce first and second phase difference signals in outputs of said respective first and second phase detectors;

third and fourth phase detectors having inputs connected to outputs of said third and fourth phase shifters, respectively, and said output of said delay means for detecting the phase difference between said further phase shifted sine waves in said outputs of said third and fourth phase shifters, respectively, and said time delayed sine waves to produce third and fourth phase difference signals in outputs of said respective third and fourth phase detectors;

amplitude comparing means having inputs connected to said amplifying means output and said timing extracting means output for comparing a direct current amplitude representing other phase detection of said amplified sine waves derived from said amplifying means output and the amplitude of said direct current control signal derived from said timing extracting means output to produce amplitude difference signals in an output of said amplitude comparing means;

a second generator of timing signals having an input coupled to another output of said timing extracting means for producing in an output of said second generator a plurality of further timing signals having frequencies different from and higher than the frequency of said fifth timing signal derived from said timing extracting means another output; and sampling means having inputs connected to said comparing means output and said second generator output and additional sampling means having inputs coupled to said first through fourth phase detector outputs and said second generator output for control by said further timing signals to translate said amplitude difference signals and said phase difference signals into said output data serial binary signal as said reproduction input data serial binary signal.

2. A receiver for a transmitted data serial binary signal of at least four bits represented by combined four sine waves having a preassigned common frequency and provided with predetermined different amounts of phase shift, each of said sine waves representing one of said signal bits; said combined sine waves also including a first timing signal having a preselected frequency related to the transmission of said four sine waves, comprising:

amplifying means for amplifying said combined four sine waves and said timing signal as received;

timing signal extracting means having an input connected to an output of said amplifying means for deriving from said amplified first timing signal a direct current control signal which is produced in an output of said timing extracting means and applied to said amplifying means to maintain said received sine waves and said timing signal at a certain level;

first and second phase shifters having inputs connected to said amplifying means output for further shifting by first and second preselected different fixed amounts the phase of said amplified sine waves to provide further phase shifted sine waves in outputs of said respective first and second phase shifters;

third and fourth phase shifters having inputs connected to said amplifying means output for further shifting by third and fourth preselected different fixed amounts the phase of said amplified sine waves to provide further phase shifted sine waves in outputs of said respective third and fourth phase shifters;

delay circuit means having an input connected to said amplfying means output for providing a time delay equal to said four input signal bits in said amplified sine waves to produce a reference phase signal in an output of said delay means;

first and second phase detectors having inputs connected to outputs of said first and second phase shifters, respectively, and an output of said delay means for detecting the phase difference between said further phase shifted sine waves in said outputs of said first and second phase shifters, respectively, and said time delayed sine waves to produce first and second phase difference signals in outputs of said respective first and second phase detectors;

third and fourth phase detectors having inputs connected to outputs of said third and fourth phase shifters, respectively, and said delay means output for detecting the phase difference between said further phase shifted sine waves in said outputs of said third and fourth phase shifters, respectively, and said time delayed sine waves to produce third and fourth phase difference signals in outputs of said respective third and fourth phase detectors;

amplitude comparing means having inputs connected to said amplifying means output and said timing extracting means output for comparing a direct current amplitude representing other phase detection of said amplified sine waves derived from said amplifying means output and the amplitude of said direct current control signal taken from said timing extracting means output to produce amplitude difference signals in an output of said amplitude comparing means;

a timing signal generator having an input coupled to another output of said timing extracting means for producing in an output of said generator a plurality of additional timing signals having different frequencies higher than said first timing signal frequency; and sampling means having inputs connected to said comparing means output and said generator output and additional sampling means having inputs coupled to said first through fourth phase detector outputs for control by said additional timing signals to translate said amplitude difference signals and said phase difference signals into an output data serial binary signal of four bits as a reproduction of said trasmitted data serial binary signal of four bits.

* * * * *